United States Patent [19]

Nagino et al.

[11] Patent Number: 5,732,069
[45] Date of Patent: Mar. 24, 1998

[54] ATM SWITCH

[75] Inventors: Hideki Nagino; Satoshi Esaka, both of Fukuoka, Japan

[73] Assignee: Fujitsu Limited, Kanagawa, Japan

[21] Appl. No.: 566,187

[22] Filed: Dec. 1, 1995

[30] Foreign Application Priority Data

Dec. 27, 1994 [JP] Japan ................... 6-324275

[51] Int. Cl.$^6$ ................................. H04B 29/00
[52] U.S. Cl. ................... 370/219; 370/296; 370/395
[58] Field of Search ........................ 370/219, 220, 370/296, 395, 396

[56] References Cited

U.S. PATENT DOCUMENTS 5,448,557  9/1995  Hauber ..................... 370/396

*Primary Examiner*—Melvin Marcelo
*Attorney, Agent, or Firm*—Helfgott & Karas, P C.

[57] ABSTRACT

The ATM switch includes a switch network section, a common section and an individual interface section. The ATM switch system can reduce a cost by sharing the common section in both cases of employing a simplex and a duplex individual interface sections. The common section includes a demultiplexer, a user cell discarding section, a header convertor, a multiplexer, an individual interface section information receiver, and a controller. The individual information receiver identifies whether the individual interface section has a simplex or a duplex structure according to information sent from the individual interface section. The controller sets the condition of demultiplexing the cells in the demultiplexer, and sets the condition of discarding the user cells in the user cell discarding section.

4 Claims, 13 Drawing Sheets

FIG. 7

|  | PASSING CONDITION OF DEMULTIPLEXER | | | PASSING CONDITION OF USER CELL DISCARDING SECTION | | | |
|---|---|---|---|---|---|---|---|
|  | CHANNELS FOR DEMULTIPLEXER | VALUE OF TAG | PASSING CELL | A: ACT, B: SBY | | A:SBY, B: ACT | |
|  |  |  |  | USER | OAM | USER | OAM |
| SIMPLEX INDIVIDUAL SECTION | #0 CHANNEL | 000 | #0 CHANNEL | Pass User/OAM cells | | | |
|  | #1 CHANNEL | 001 | #1 CHANNEL | | | | |
|  | #2 CHANNEL | 010 | #2 CHANNEL | | | | |
|  | #3 CHANNEL | 011 | #3 CHANNEL | | | | |
|  | #4 CHANNEL | 100 | #4 CHANNEL | | | | |
|  | #5 CHANNEL | 101 | #5 CHANNEL | | | | |
|  | #6 CHANNEL | 110 | #6 CHANNEL | | | | |
|  | #7 CHANNEL | 111 | #7 CHANNEL | | | | |
| DUPLEX INDIVIDUAL SECTION | #0 CHANNEL | -00 | A: FOR #0 CHANNEL | ○ | ○ | × | ○ |
|  |  |  | B: FOR #4 CHANNEL | × | ○ | ○ | ○ |
|  | #1 CHANNEL | -01 | A: FOR #1 CHANNEL | ○ | ○ | × | ○ |
|  |  |  | B: FOR #5 CHANNEL | × | ○ | ○ | ○ |
|  | #2 CHANNEL | -10 | A: FOR #2 CHANNEL | ○ | ○ | × | ○ |
|  |  |  | B: FOR #6 CHANNEL | × | ○ | ○ | ○ |
|  | #3 CHANNEL | -11 | A: FOR #3 CHANNEL | ○ | ○ | × | ○ |
|  |  |  | B: FOR #7 CHANNEL | × | ○ | ○ | ○ |
|  | #4 CHANNEL | -00 | A: FOR #0 CHANNEL | ○ | ○ | × | ○ |
|  |  |  | B: FOR #4 CHANNEL | × | ○ | ○ | ○ |
|  | #5 CHANNEL | -01 | A: FOR #1 CHANNEL | ○ | ○ | × | ○ |
|  |  |  | B: FOR #5 CHANNEL | × | ○ | ○ | ○ |
|  | #6 CHANNEL | -10 | A: FOR #2 CHANNEL | ○ | ○ | × | ○ |
|  |  |  | B: FOR #6 CHANNEL | × | ○ | ○ | ○ |
|  | #7 CHANNEL | -11 | A: FOR #3 CHANNEL | ○ | ○ | × | ○ |
|  |  |  | B: FOR #7 CHANNEL | × | ○ | ○ | ○ |

FIG. 10

| Classification of Individual Section | MXS | *HACT | 0 | Classification of cell | |
|---|---|---|---|---|---|
| | | | | OAM | USER |
| Simplex Individual Section | 0 | 1 | 1 | – | O |
| | 0 | 1 | 0 | O | – |
| Duplex Individual Section | 1 | 0 | 1 | – | O |
| | 1 | 0 | 0 | O | – |
| | 1 | 1 | 1 | – | O |
| | 1 | 1 | 0 | O | – |

USER/OAM cell recognizing bit
  0="1" ⇒ under receiving user cell
  0="0" ⇒ under receiving OAM cell Duplex Individual section
ACT/SBY recognizing signal
  *HACT="1" ⇒ ACT
  *HACT="0" ⇒ SBY Simplex/duplex individual section
instruction signal
  MXS="0" ⇒ Simplex individual section
  MXS="1" ⇒ Duplex individual section

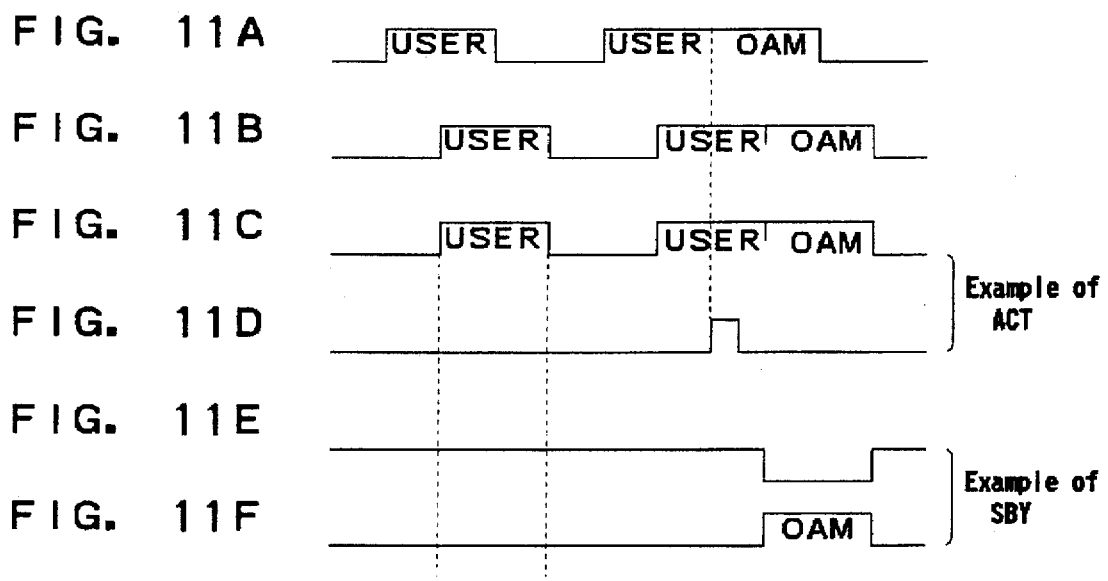

4

ATM SWITCH

BACKGROUND OF THE INVENTION

1. Field of the Invention

The present invention relates to an ATM switch, which can be operated in both structures of simplex and duplex interfaces with the use of a same interface common card.

ATM (Asynchronous Transfer Mode) system is to transfer ATM cells, each of which is composed of 54 bytes including a data field of 48 bytes and a header of 6 bytes. Several structures of the ATM switch, which exchanges the ATM cells, have been proposed.

2. Description of the Related Art

An ATM switch is formed of individual interface sections, which are connected to subscribers, an ATM switch network section, which sets paths according to path setting information, and a common section provided between the individual interface sections and the ATM switching network section, which provides the path setting information.

FIG. 1 shows one structural example of an ATM switch. In the example, an individual interface section is simplex, however, an ATM switch network section and a common section are duplexed in order to improve reliability of the ATM switch. In FIG. 1, an individual interface section 52 having a simplex structure is provided for an ATM switch network section 50-0 and a common section 51-0 of a 0 group channel and an ATM switch network section channel 50-1 and a common section 51-1 of a 1 group channel.

The individual interface section 52 includes a selector, not shown in the diagram, which selects either active or standby group, and the interface section 52 is further connected to terminals of subscribers and active one of the common sections 51-0 and 51-1.

For example, the 0 group channel is set to active (ACT) and the 1 group channel is set to standby (SBY). In this case, the individual interface section 52 selects the side of the common section 51-0 of the 0 group channel, so that ATM cells are transferred through the common section 51-0 and an ATM switch network section 50-0 of the 0 group channel, as shown with arrows.

When a fault is generated on the 0 group channel, the individual interface section 52 selects the side of the common section 51-1 of the 1 group channel according to fault information. Accordingly, the ATM cells are switched to be transferred through the ATM switch network section 50-1 and the common section 51-1 of the 1 group channel.

FIG. 2 is a diagram for explaining another structure of the ATM switch, when employing a duplex individual interface section. The structure shown in FIG. 2 includes a switch network section 60-0, a common section 61-0, a duplex individual interface section 62-0 and a duplex device 63-0 of the 0 group channel, and a switch network section 60-1, a common section 61-1, a duplex individual interface section 62-1 and a duplex device 63-1 for the 1 group channel, and a plurality of individual interface sections 64, which are connected to subscribers.

An individual interface section 64 distributes the ATM cells and sends the distributed ATM cells to the duplex devices 63-0 and 63-1. Then, the individual interface section 64 transfers the ATM cells sent from active one of the duplex devices 63-0 and 63-1, and discards user cells sent from the standby one of the duplex devices 63-0 and 63-1. The individual interface sections 62-0 and 62-1 form duplex individual interface sections by the use of the duplex devices 63-0 and 63-1 and respectively provide a selector, not shown in FIG. 2, which selects and connects to active one of the common sections 61-0 and 61-1.

For example, the 0 group channel is employed as active group, and the 1 group channel is employed as standby group. In this case, the individual interface section 64 distributes the ATM cells into the 0 and 1 group channels. As shown with solid and broken arrow lines, the distributed cells are transferred to the common section 61-0 of the 0 group channel through the duplex devices 63-0 and 63-1, and the individual interface sections 62-0 and 62-1.

The ATM cells sent from the switch network section 60-0 of the 0 group channel is distributed into the 0 and 1 group channels by the common section 61-0. As shown with solid and broken arrow lines, the cells are transferred to the individual interface section 64 through the individual interface sections 62-0 and 62-1, and the duplex devices 63-0 and 63-1. The individual interface section 64 discards the user cells sent from the 1 group channel and transfers the user cells sent from 0 group channel to the corresponding subscribers.

The common section 61-0 of the 0 group channel discards the user cells sent from the 1 group channel and transfers the user cells sent from the 0 group channel to the switch network section 60-0. In this case, the common section 61-0 makes only OAM (Operation, Administration and Maintenance) cells for maintenance and monitoring pass without discarding even if the cells are inputted through the 1 group channel. Further, the OAM cells for maintenance and monitoring are periodically sent in order to keep reliability of the system.

In the structure where the simplex individual interface section 52 is employed as shown in FIG. 1, for example, the individual interface section 52 transfers the ATM cells with the speed of 1.5 Mbps. However, the transferring speed in the common sections 51-0 and 51-1 and the switch network sections 50-0 and 50-1 is, for example, 150 Mbps. That brings a problem that usage modulus of paths becomes low.

In the structure where the duplex individual interface sections 62-0 and 62-1 are employed as shown in FIG. 2, the duplex devices 63-0 and 63-1 are further provided to multiplex the ATM cells in the plurality of individual interface sections 64, and the individual interface sections 62-0 and 62-1 are also duplexed.

In this case, functions of the common sections 51-0 and 51-1 for the simplex individual interface section 52 shown in FIG. 1 are different from those of the common sections 61-0 and 61-1 for the duplex individual interface sections 62-0 and 62-1 shown in FIG. 2. Therefore, different common sections were conventionally formed for the simplex individual interface section and the duplex individual interface section, respectively. Accordingly, the structures of the simplex individual interface section and the duplex individual interface section are fixedly present according to the condition of the number of subscribers received in the ATM switch of an ATM network. That causes increasing the cost of the ATM network.

SUMMARY OF THE INVENTION

Accordingly, it is an object of the present invention to provide an ATM switch, which realizes decreasing the cost of the system by a combined use of the common section, when employing the simplex and duplex individual interface sections.

It is another object of the present invention to provide an ATM switch, which prohibits discarding user cells, when employing the simplex individual interface section, and further, of which an active individual interface section prohibits discarding user cells, and an standby individual interface section discards the user cells, when employing duplex individual interface section.

It is further object of the present invention to provide an ATM switch, in which a simplex individual interface section multiplexes and demultiplexes according to a tag value in the header of a cell, when employing the simplex individual interface section, and a duplex individual interface section distributes the ATM cells by multiplexing and demultiplexing according to lower bits of the tag value, when employing the duplex individual section.

Further, it is an object of the present invention to provide an ATM switch, in which an active individual interface section transmits all cells including user cells and a standby individual interface section discards the user cells, when employing the duplex individual interface section, and an active duplex device transmits all cells including user cells and a standby individual interface section discards the user cells, when employing a duplex individual interface section.

The ATM switch according to the present invention includes a switch network section, a common section and an individual interface section, the common section having a demultiplexor for multiplexing and demultiplexing cells and transferring the multiplexed/demultiplexed cells sent from the switch network section to the individual interface section, a user cell discarding section for discarding the user cells sent from the individual interface section, when giving a specified condition, a header convertor for converting a header of the cell sent from the individual interface section to a header for routing in the switch network and sending the converted header, a multiplexer for multiplexing the cells and transfer the multiplexed cells to the switch network section, an individual interface section information receiver for identifying whether an individual interface section has a simplex or a duplex structure, and a controller for setting tag value of the demultiplexor based on the received information sent from the individual interface section information receiver and setting a condition of discarding the cells in the user cell discarding section.

Further, other objects of the present invention become clearly by the description for explaining embodiments according to the attached drawings.

BRIEF DESCRIPTION OF THE DRAWINGS

FIG. 7 shows a condition for passing cells.

FIG. 10 shows a condition for discarding user cells.

FIG. 11, comprising FIGS. 11A to 11F, is a diagram for explaining an operation of a user cell discarding section.

DESCRIPTION OF THE PREFERRED EMBODIMENTS

Figure 1:
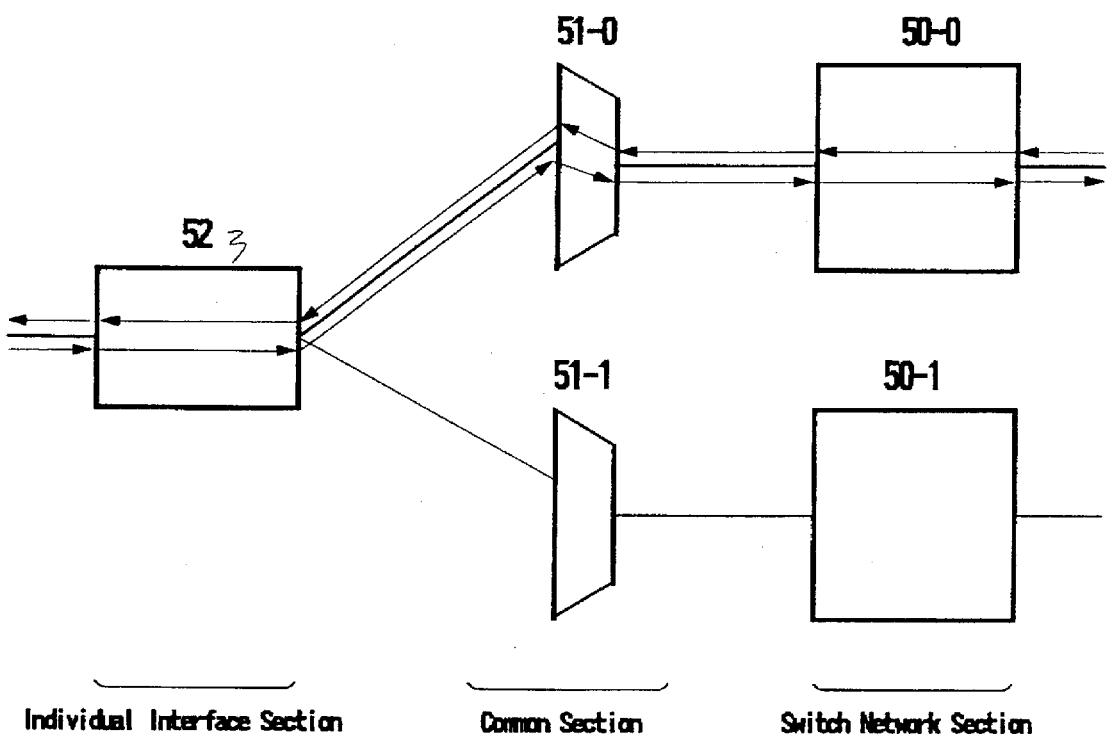
FIG. 1 is a diagram for explaining a structure of an ATM switch, when employing a simplex individual interface section.

Throughout the following descriptions, the same reference numerals are used to denote and identify corresponding or identical components.

Figure 3:
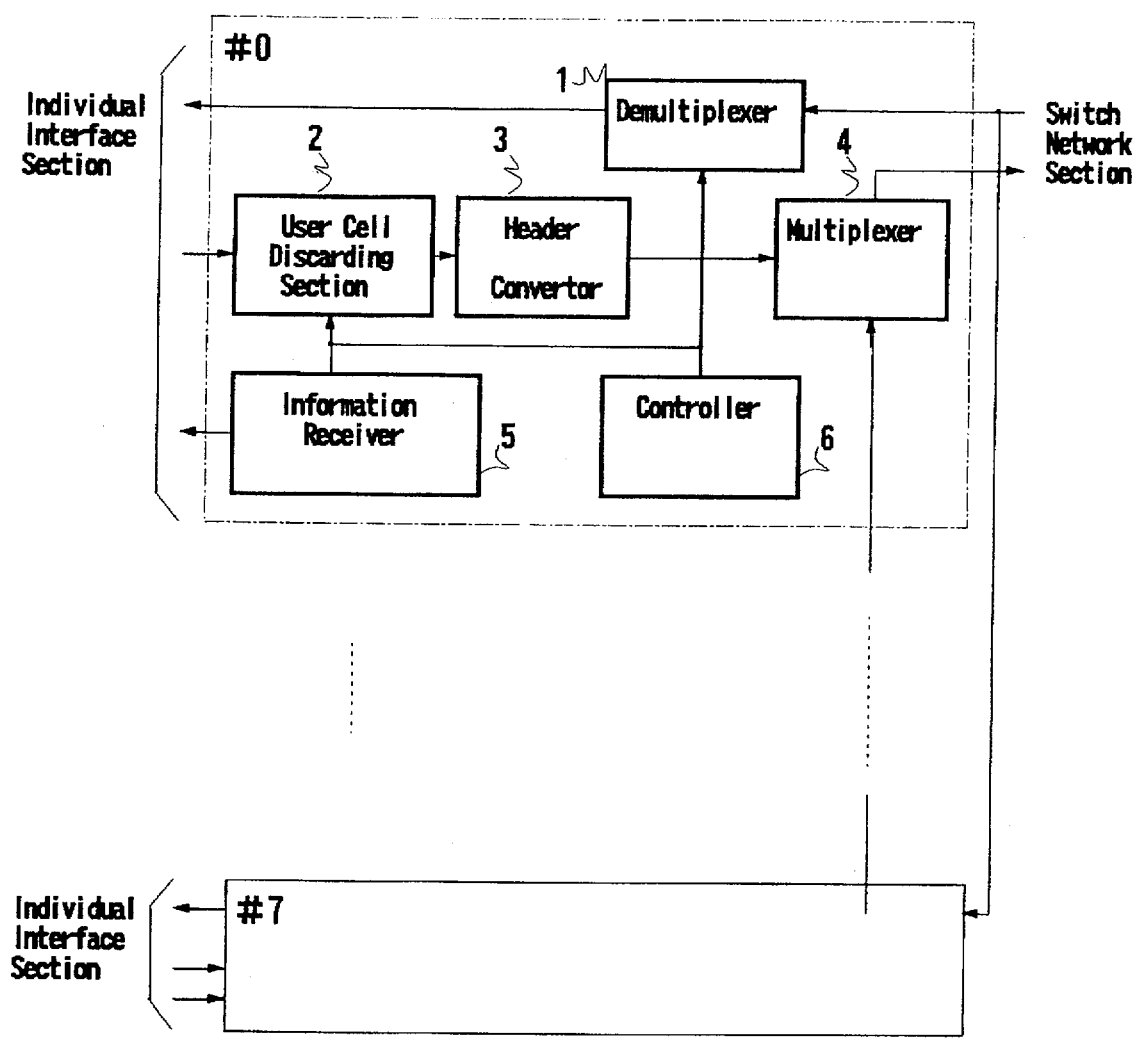
FIG. 3 shows a principle of embodiments according to the present invention.

FIG. 3 shows a principle of an ATM switch according to the present invention, and more particularly, it shows a structure of a common section, which is provided between a switch network section and an individual interface section. In this example, the common section provides eight sets of channel corresponding sections #0 to #7. Each of the channel corresponding sections #0 to #7 has the same structure, substantially. In FIG. 3, a structural block diagram of the channel corresponding section #0 is shown.

The channel corresponding section #0 includes a demultiplexer 1, a user cell discarding section 2, a header convertor 3, a multiplexer 4, an information receiver 5 and a controller 6.

Figure 4:
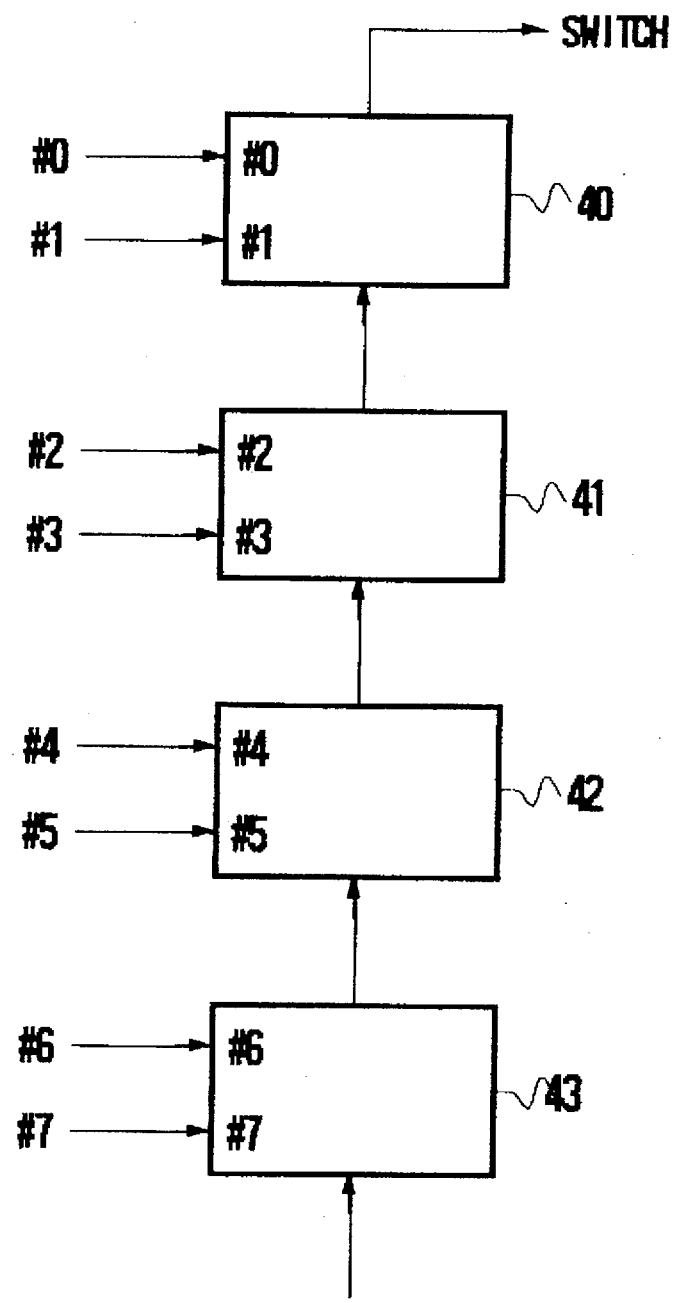
FIG. 4 shows a structure for connecting channel corresponding sections of the ATM switch, when employing a simplex individual interface section.

When an ATM switch provides a simplex individual interface section, as shown in FIG. 4, the ATM switch is connected to eight individual interface sections for sending each of different signals corresponding to each of the channel corresponding sections #0 to #7. In this embodiment, pairs of the channel corresponding sections #0 and #1, the channel corresponding sections #2 and #3, the channel corresponding sections #4 and #5, and the channel corresponding sections #6 and #7 are respectively formed on common LSI boards 40, 41, 42 and 43.

Further, the channel corresponding sections #0 to #7 are connected by the multiplexer 4, which is later described. More particularly, the ATM cells sent from the individual interface sections corresponding to the channel corresponding sections #6 and #7 are multiplexed in the multiplexer 4 formed on the LSI board 43.

The duplexed output sent from the LSI board 43 is further inputted to the multiplexer 4 formed on the LSI board 42, to which the channel corresponding sections #4 and #5 are corresponded. The output of the multiplexer 4 on the LSI board 43 and the ATM cells sent from the individual interface sections corresponding to the channel corresponding sections #4 and #5 are multiplexed in the multiplexer 4 on the LSI board 42.

In this way, the ATM cells sent from the individual interface sections corresponding to the channel corresponding sections #0 to #7 are multiplexed by piling up in order of LSI boards 43, 42, 41 and 40 and sent through the multiplexer 4 on the LSI board 40 to the switch network section.

Figure 5:
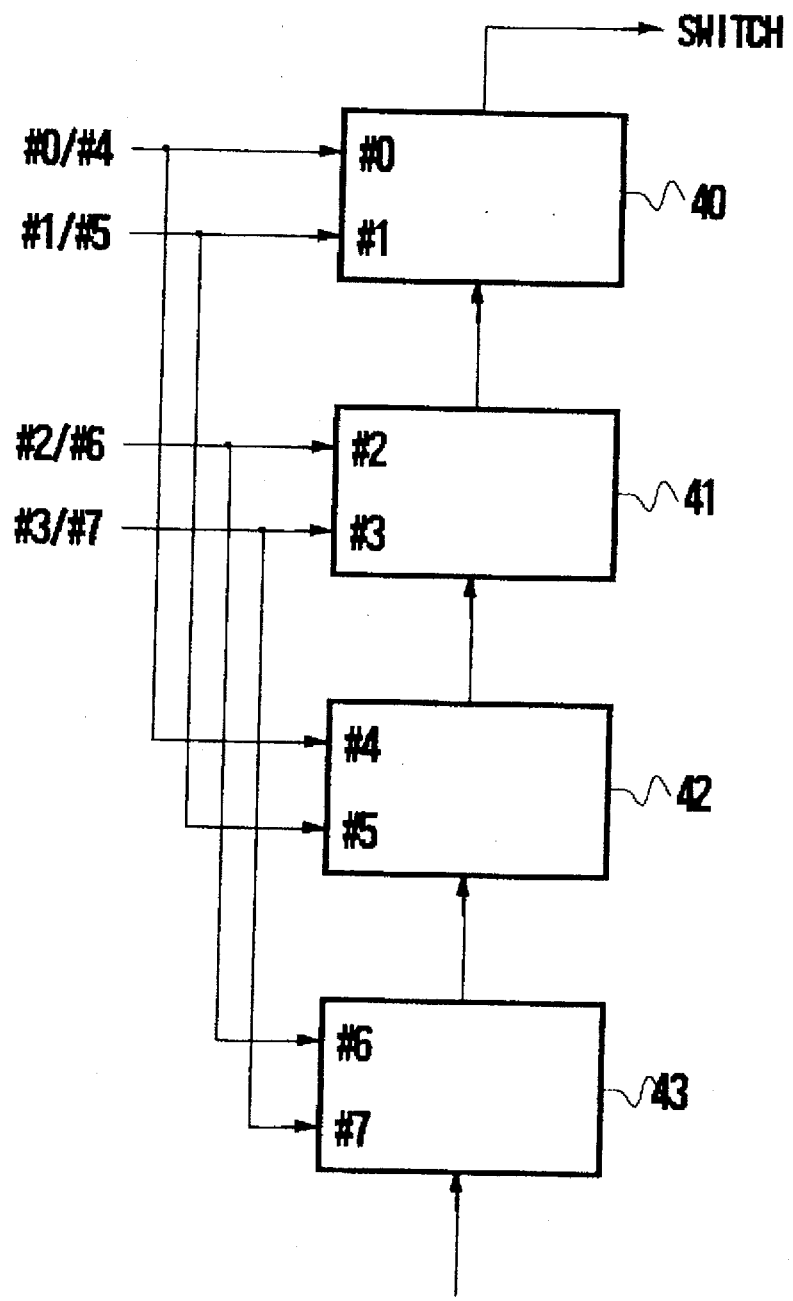
FIG. 5 shows a structure for connecting channel corresponding sections of the ATM switch, when employing a duplex individual interface section.

FIG. 5 shows an embodiment for connection, when employing a duplex individual interface section. The structure shown in FIG. 5 is common with that of the common section shown in FIG. 4. In the embodiment of FIG. 5, four sets of individual interface sections, each set of which has a relationship of active and standby, are connected in correspondence with the sets of the channel corresponding sections #0 and #4, #1 and #5, #2 and #6, and #3 and #7.

When the individual interface sections corresponding to the channel corresponding sections #0, #1, #2 and #3 are active, the channel corresponding sections #4, #5, #6 and #7 become standby condition for each of the active individual interface sections.

Figure 2:
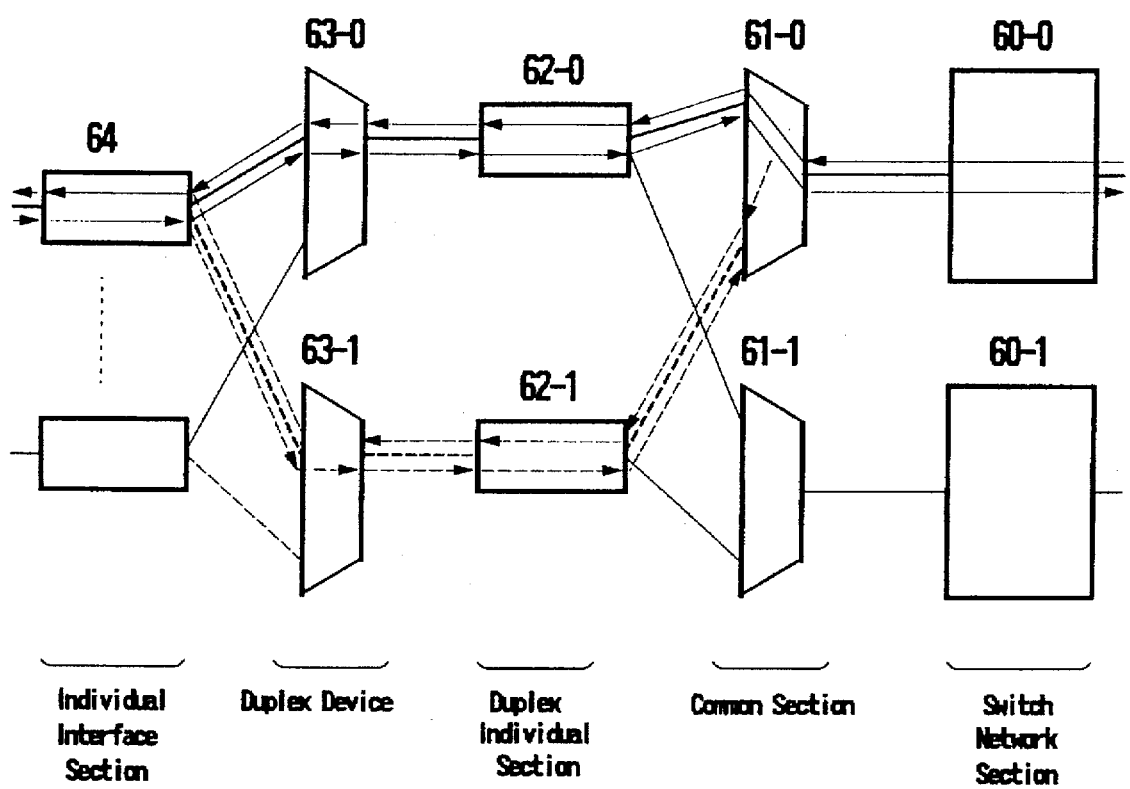
FIG. 2 is a diagram for explaining a structure of an ATM switch, when employing a duplex individual interface section.

Returning to FIG. 3, the channel corresponding sections #0 to #7 are connected to the corresponding individual interface sections so as to have the relationship between FIGS. 4 and 5, by data lines. Further, the information receiver 5, which receives control information sent from the individual interface section, is connected to the corresponding individual interface section, by control information lines independent from the data lines. The receiver 5 can identify whether the individual interface section has a simplex structure, as shown in FIG. 1, or a duplex structure, as shown in FIG. 2, according to the received control information, as later described.

The controller 6, which is formed of a micro processor, sets a condition of demultiplexing in the demultiplexor 1, according to the judgment of the simplex or duplex structure in the receiver 5. Namely, the controller 6 sets tag value in the header of the ATM cells to indicate the condition of the simplex or duplex structure. Further, the controller 6 sets the condition of discarding the user cells in the user cell discarding section 2.

The header convertor 3 converts the header of the ATM cells to a header for routing in the switch network section, based on virtual path identifier (VPI) and virtual channel identifier (VCI) in the header of the ATM cells. The switch network section sends out the ATM cells to the output routing according to the content of the header for routing.

The multiplexer 4 in each of the channel corresponding sections #0 to #7 multiplexes the ATM cells having a header for routing from the individual interface section in the modes explained in FIGS. 4 and 5, and transfers the multiplexed ATM cells to the switch network section.

Figure 6:
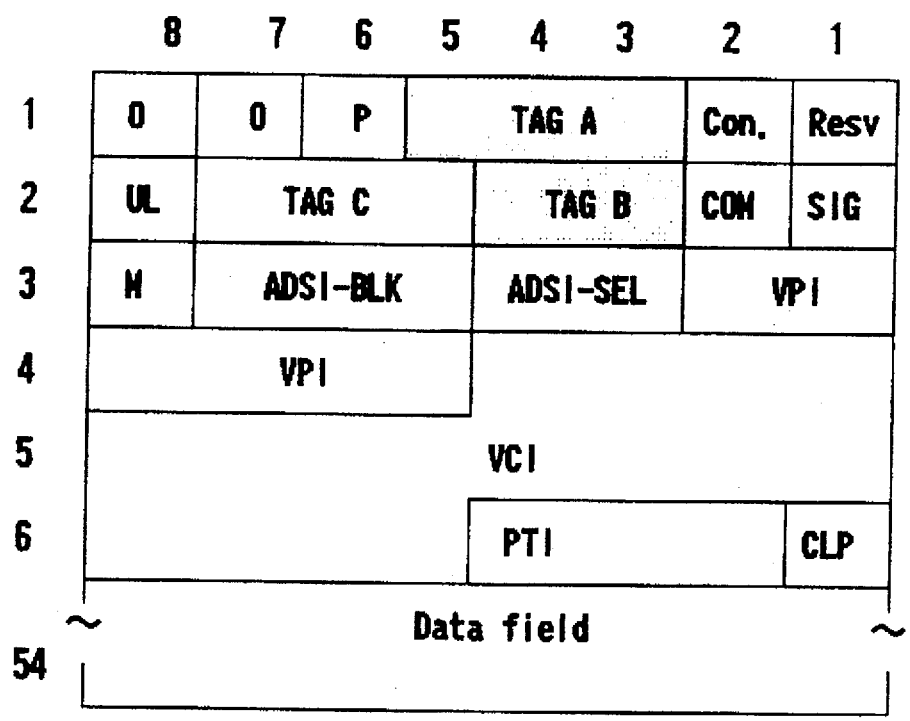
FIG. 6 illustrates an ATM cell format.

Referring now to FIG. 6, one example of a format of an ATM cell is shown. In FIG. 6, the ATM cell includes a header of the first to sixth bytes and a data field of the seventh to fifty-fourth bytes.

In FIG. 6, dotted sections (TAGs A and B) are employed for routing the ATM cells in the switch network section. Further, a TAG C section is employed for identifying the channel corresponding sections in the common section.

The other contents included in the headers will be explained according to the necessity in the related section in the explanation of the structural part of the sections shown in FIG. 3.

FIG. 7 shows an explanatory diagram of a condition of passing cells. As explained above, the common sections of the 0 and 1 group channels provide the eight channel corresponding sections #0 to #7. The demultiplexer 1 in each channel corresponding section judges whether or not the multiplexed ATM cells, which are sent from the switch network section, are the ATM cells to be demultiplexed and passed to demultiplex to the connected subscribers. Further, the user cell discarding section 2 judges that the ATM cells sent from the connected individual interface section are passed to multiplex in the multiplexer 4.

In this example, a passing condition in the demultiplexer 1 and a passing condition in the user cell discarding section 2, i.e., showing whether or not the cells are to be passed, are shown. To fulfill the condition of passing the cells in the demultiplexer 1, the tag value (refer to TAG C shown in FIG. 6) in the header of the ATM cell shown in FIG. 6 is composed of 3 bits.

The condition of passing the cells in the user cell discarding section 2 is based on the judgment whether or not the channel corresponding section having the user cell discarding section 2 belongs to an active or standby group. In FIG. 7, A and B show 0 and 1, and ACT and SBY show active and standby groups, respectively. O marks show that the cells can be passed, and the X marks show that the cells are discarded.

For example, when employing the simplex individual interface section, the demultiplexer 1 is set as to demultiplex the ATM cells by employing 3 bits of the TAG value of "TAG C" in the header of the cells. Accordingly, if the tag value of the header of the ATM cells sent from the switch network section is "000", the demultiplexer 1 of the channel corresponding section #0 in the common section demultiplexes the ATM cells by the use of the tag value of 3 bits and transfers them to the connected corresponding individual interface section.

The demultiplexor 1 demultiplexes the ATM cells by the use of the tag value of 3 bits of the ATM cells sent from the switch network section, and transfers the demultiplexed cells as passed cells to the corresponding individual interface section. Further, the user cell discarding sections 2 in the channel corresponding sections #0 to #7 make both of the user cells for information sent from the individual interface sections and OAM cells for maintenance be passed.

When employing the structure of a duplex individual interface section, the controller 6 controls the demultiplexer 1 to ignore the upper 1 bit of the 3 bits of "TAG C" in the header of the ATM cell, and demultiplex the cells according to the lower 2 bits.

For example, the value of tag is "000". The demultiplexer 1 of each of the channel corresponding sections #0 and #4 demutilplexes the ATM cells and sends the demultiplexed cells to the individual interface sections connnected to the channel corresponding sections #0 and #4, because of employing "00" of the lower 2 bits.

When the tag value of "TAG C" in the header of the ATM cells is "000", the corresponding channels are distributed for the channel corresponding sections #0 to #4 as to indicate that the passed cells for #0 channel corresponds to the 0 group channel A and the passed cells for #1 channel corresponds to the 1 group channel B.

Further, when the tag value is "011", the demultiplexer 1 demultiplexes the ATM cells by employing "11" of the lower 2 bits. Therefore, the demultiplexor 1 of each of the sections #3 and #7 demultiplexes the ATM cells and transfers the demultiplexed cells to the individual interface section. That is, the cell, of which tag value is "011", is distributed into #3 and #7 channels. In this case, as shown in FIG. 5, #0 to #3 channels are the 0 group channel and #4 to #7 channels are the 1 group channel.

Further, the user cell discarding section 2 in the channel corresponding section identifies whether the channel corresponding section is connected to a simplex individual interface section or to a duplex individual interface section. Then, the user cell discarding section 2 is set according to the judgment whether the user cell is discarded or passed, i.e., active (ACT) or standby (SBY).

As described above, when employing a simplex individual interface section, the user cells cannot be discarded and all of the cells are passed. When employing a duplex individual interface section, all of the OAM cells for maintenance can be passed. However, only the user cells sent from the active (ACT) individual interface section can be passed and the cells set from the standby group are discarded.

For example, in the individual corresponding section for the #0 channel, the upper 1 bits of the tag value of 3 bits is ignored, the lower 2 bits are "00", and the passed cells are for A:#0 channel and B:for #4 channel. In this case, if the 0 group channel A is active (ACT), the user cells are passed as shown with "○" marks, while the user cells are discarded as shown with "x" marks. Similarly, if the B is active (ACT), the user cells are passed as shown by "○" marks. When the B is standby (SBY), the user cell are discarded as shown with "x" marks.

Accordingly, in the structure, when employing the duplex individual interface section shown in FIG. 2, if the 0 group channel is active, the demultiplexor 1 of the individual corresponding section can transfer the cells sent from the ATM switch network section 60-0 to the duplex individual interface sections 62-0 and 62-1 of the 0 and 1 group channels in the common section 61-0. Further, the demultiplexer 1 makes the user cells and the OAM cells sent from the individual interface section 62-0 of the 0 group channel to be passed, discards the user cells sent from the individual interface section 62-1 of the 1 group channel, and makes only the OAM cells to be passed.

As described above, when employing the duplex individual interface section, the user cell discarding section 2 discards the standby user cells. Accordingly, in the structure shown in FIG. 2, if the 0 group channel is active, the duplex individual interface section 62-1 of the 1 group channel passes the OAM cells and discards the user cells.

The duplex device 63-1 of the 1 group channel passes the OAM cells and discards the user cells. More particularly, the standby duplex device or the duplex individual interface section can discard the user cells by identifying that the duplex individual interface section has a duplex structure. In this case, the user cell discarding section 2 in the common section can employ the structure for discarding the user cells according to the other specified condition, such as the case of generating congestion.

Figure 8:
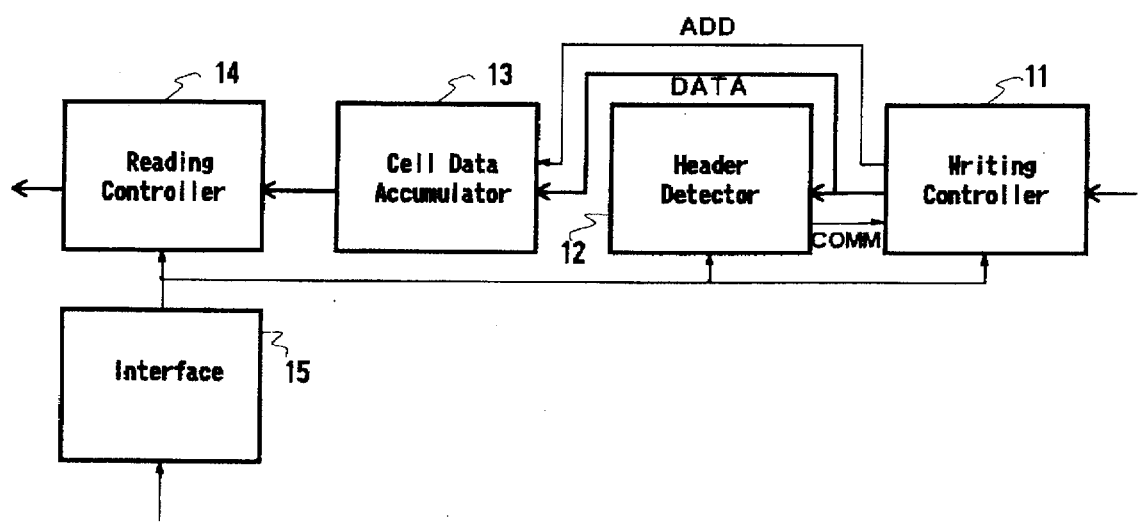
FIG. 8 is an explanatory diagram of an embodiment of a demultiplexor in FIG. 3.

FIG. 8 shows a structural diagram of the demultiplexer according to the present invention. The demultiplexer includes a writing controller 11, a header detector 12, a cell data accumulator 13, a reading controller 14, an interface 15 for interfacing with the controller 6 composed of a micro processor. In FIG. 8, a bold line shows a flow of a data, and a thread line shows a flow of a control signal including an address signal.

The writing controller 11, which is a controller composed of a micro processor, receives the ATM cells sent from the switch network section, and converts the ATM cell format of 8 bits×54 words, as shown in FIG. 6, to the format of 48 bits×9 words. Further, a writing controller 11 discards the cells having errors as the result of parity check.

The header detector 12 has a comparator, as a basic structure, and compares the header of 48 bits×1 words in the ATM cell sent from the writing controller 11 with the setting information prescribed by the controller 6 through the interface 15. As the result of the comparison, if the header is corresponding to the setting information, it is identified whether or not the cells should be passed to the individual interface section. Then, the detector 12 notifies that the identified cells should be written in the cell data accumulator 13 to the writing controller 11.

When the writing controller 11 receives a notification COMM sent from the header detector 12, the controller 11 sends the writing data DATA with the writing address ADD to the cell data accumulator 13.

The above-described prescribed setting information will be explained. The setting information is composed of 6 bits including the tag value (TAG C) of 3 bits, a bit (UL) of 1 bit employed when increasing channels, an internal LAP cell identified bit (SIG) of 1 bit, and a LAP identified bit (COM), which is employed in a common section, of 1 bit.

The number of capability of specifying channels become the maximum $2^4$ corresponding to the sum of the bit number of tag value (TAG C) and the bit employed when increasing channels. Further, the internal LAP cell identified bit (SIG) shows "0"=user cell, and "1"=LAP cell. The LAP identified bit (COM) identifying the use of the common section shows "0"=use of the common section, and "1"=other cases.

The above-described bit (UL) employed when increasing channels (UL) will be explained. The common section 61 is formed of the channel corresponding sections #0 to #7, as shown in FIG. 3, and when channels increase more, additional channel corresponding sections #8 to #15 having the same structure as the sections #0 to #7 are added. Then, the channel corresponding sections #0 to #7 are defined as the upper sections, and the added channel corresponding sections #8 to #15 are defined as the loser sections. The upper sections #0 to #7 and the lower sections #8 to #15 are connected in a chain-form or in series. Further, the employed bit (UL) employed when increasing channels, of 1 bit switches the upper sections and the lower sections to connect to the switch network section.

The cell data accumulator 13 is composed of a dual port RAM including a buffer memory having capacity, which guarantees transmission quality of the cell data. The cells accumulated in the cell data accumulator 13 are read out by the reading controller 14 according to a request signal for reading the cells from the individual interface section and are outputted to the individual interface section. The reading controller 14, which is composed of a micro controller, issues the reading address or counts the passing cells, which are read out, according to the request signal for reading the cells sent from the individual interface section.

The interface 15 has interface function with the controller 6 (refer to FIG. 3). The interface 15 transfers the setting information to the above-described header detector 12, counts the number of sent cells in the reading controller 14, and controls the generation of parity pseudo-fault and so on.

Figure 9:
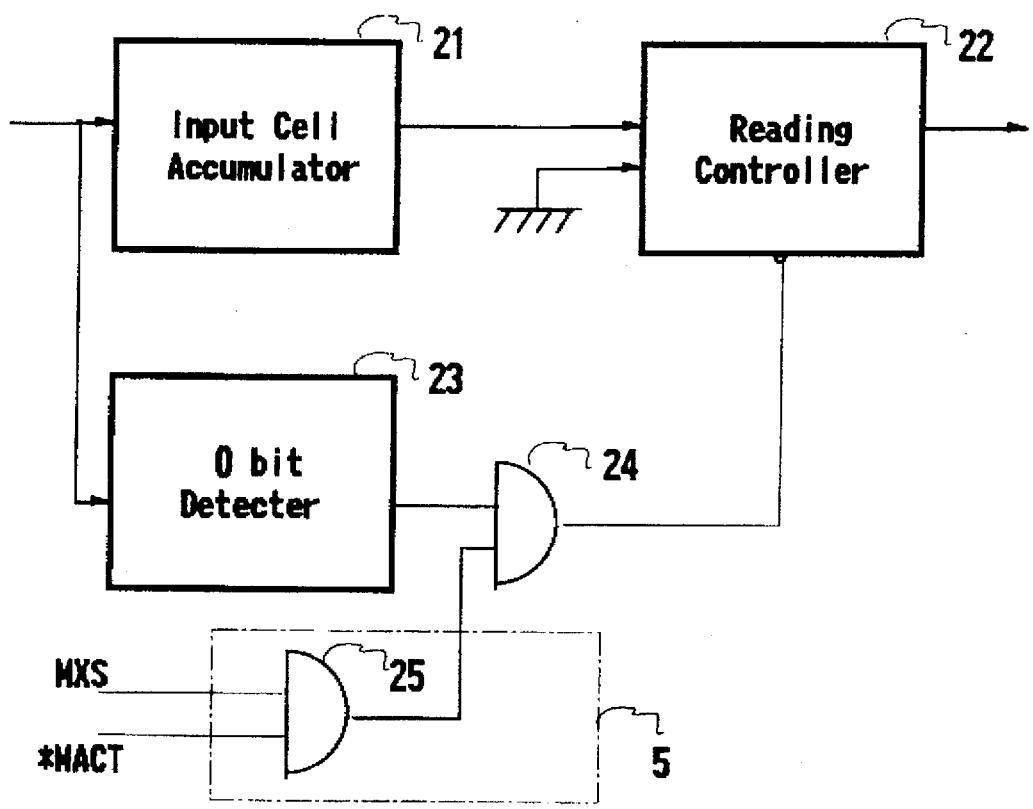
FIG. 9 is a diagram for explaining an embodiment of a user cell discarding section and an information receiver in FIG. 3.

FIG. 9 is an explanatory diagram of the embodiment of the user cell discarding section 2 and the information receiver 5. The user cell discarding section 2 and the information receiver 5 are formed of an input cell accumulator 21, which can be composed of a dual port RAM, a reading controller 22, which can be composed of, for example, a tri-state buffer, an O bit detector 23, which can be composed of a comparator, an AND circuit 24, and the receiver 5 for receiving the information sent from the individual interface section including an AND circuit 25.

MXS, which is inputted to one input terminal of the AND circuit 25, is a signal for specifying whether the individual interface section is simplex or duplex. "0" means that the individual interface section has a simplex structure, and "1" means that the individual interface section has a duplex structure. Further, *MACT is a signal for identifying whether the duplex individual interface section is active (ACT) or standby (SBY). "0" means that the duplex individual interface section is active (ACT), and "1" means that the duplex individual interface section is standby (SBY).

Further, the O bit, which is corresponding to the seventh bit of the first byte of the ATM cell format (refer to FIG. 6) and is detected by the 0 bit detector 23, identifies whether the ATM cells are the user cells or the OAM cells for maintenance. When the O bit is "1", the user cells are being received. When the O bit is "0", the OAM cells for maintenance are being received.

The information receiver 5 receives the signal MXS for specifying whether the individual interface section is simplex or duplex, and the signal *MACT for identifying whether the duplex individual interface section is ACT or SBY, from the controller 6 (refer to FIG. 3).

If MXS is "1" because of employing the duplex individual interface section, *MACT is "1" because of employing the standby duplex individual interface section, and O is "1" because of receiving the user cells, the output signals of the AND circuits 24 and 25 become "1", and the reading controller 22, which is a tri-state buffer, becomes disable. That is, the user data read from the input cell accumulator 21 is discarded and the output of the reading controller 22 is fixed to the ground potential "0".

Meanwhile, since O="0" while receiving the OAM cells, the reading controller 22 sends the OAM cells read from the input cell accumulator 21.

FIG. 10 shows conditions for discarding the user cells in the embodiment of the present invention according to the above-described contents. In FIG. 10, "○" marks mean the case where the user cells are passed, and "x" marks mean the case where the user cells are discarded, according to a classification of the individual interface section showing whether the cells are OAM cells or user cells, under the condition of an instruction signal MXS, which shows whether the individual interface section is simplex or duplex, a signal *MACT identifying whether the duplex individual interface section is ACT or SBY, and a recognizing bit O, which showing whether the cells are user data or OAM data.

FIG. 11A to 11F show explanatory diagrams of an operation in the embodiment of the user cell discarding section 2 shown in FIG. 9, according to the present invention. FIG. 11A shows input cells, and FIG. 11B shows output cells when employing a simplex individual interface section. FIG. 11C shows output cells on the ACT individual interface section, when employing a duplex individual interface section, FIG. 11d shows an O bit judging output signal on the SBY individual interface section, FIG. 11E shows an output signal of the AND circuit 24 on the SBY individual interface section, and FIG. 11F shows an output cell on the SBY individual interface section.

The input cells shown in FIG. 11A are temporally accumulated in the input cell accumulator 21. When an individual interface section, which sends the input cells, is an ACT simplex or ACT duplex individual interface section, the cells are read out from the reading controller 22. Accordingly, as shown in FIGSS. 11B and 11C, both the user cells and the OAM cell are similarly outputted. However, when the individual interface section is a SBY duplexed individual interface section, as described above, MXS="1" and *MACT="1". The O bit detector 23 outputs "1" while receiving the user cells. Therefore, the reading controller 23 is made disable according to the signal of "1" sent from the AND circuit 24. As the result, the user cells are discarded.

However, as shown the relationship between FIGS. 11A and 11D, the O bit detector 23 detects the input cells are the OAM cell, a signal of "0" is outputted as shown in FIG. 11E, when reading out the OAM cell. By the signal of "0", the output signal of the AND circuit 24 becomes "0", the reading controller 22 reads the OAM cells from the input cell accumulator 21, and the user cells are discarded as shown in FIG. 11F, but the OAM cells is passed.

Figure 12A:
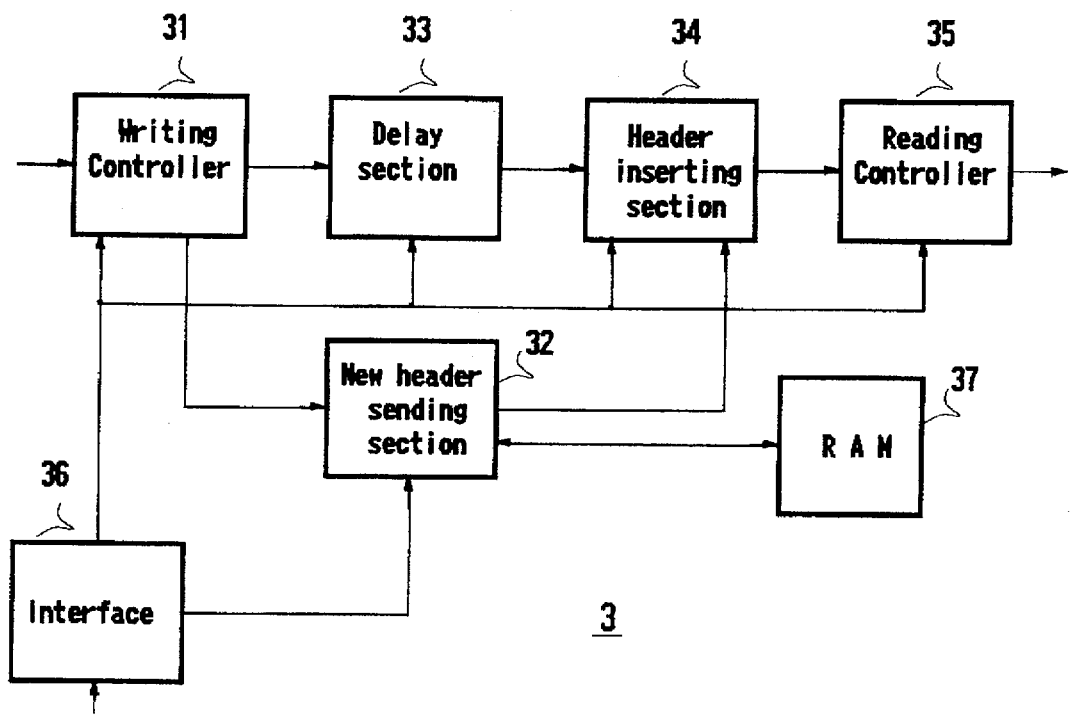
FIG. 12A shows an embodiment of a header convertor in FIG. 3.
Figure 12B:
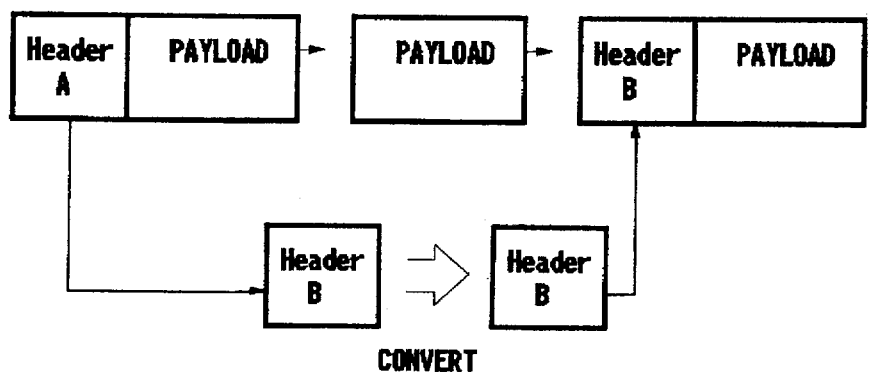
FIG. 12B shows an operation of converting header in the header convertor of FIG. 12A.

FIG. 12A shows a structural diagram of the embodiment of the header convertor 3, and FIG. 12B shows an explanatory diagram of the operation of the header convertor 3. In FIG. 12A, the header convertor 3 includes a writing controller 31, a new header sending section 32, a delay section 33, a header inserting section 34, a reading controller 35, and an interface 36.

The writing controller 31 converts a format of 8 bits×54 words of the cells passed through the user cells discarding section 2 (refer to FIG. 3) to a format of 48 bits×8 words, which is then separated to a header of 48 bits×1 word and a payload of 48 bits×8 words.

The header of 48 bits×1 word is inputted to the new header sending section 32. The payload of 48 bits×8 words is sent to the header inserting section 34 through the delay section 33, which is composed of a shift register.

Contents of the new header, which is found by converting the header inputted to the new header sending section 32, are stored in the RAM 37 in advance. Further, the header inputted to the new header sending section 32 is employed as an address to read the contents of the new header stored in the RAM 37.

Accordingly, the new header sending section 32, which basically includes a function for decoding addresses, decodes the header of 48 bits×1 word inputted to the new header sending section 32 as address data, and outputs address signals for the RAM 37, in which the contents of the corresponding new header are stored.

The contents of the new header read from the RAM 37 have information for prescribing routing in the ATM switching shelf. The new header read from the RAM 37 is further inputted to the header inserting section 34. The header inserting section 34 adds the new header section to the payload of 48 bits×8 words, which is transferred through the delay section 33.

The delay section 33 delays the time required for detecting the contents of the new headers in the new header section 32.

The reading controller 35 converts the format of 48 bits ×9 words of the ATM cell, which is formed by adding the new header sent from the new header sending section 32 to the payload from the delay section 33 in the header inserting section 34, to the format of 8 bits×54 words.

The above-described explanations can be totally illustrated as shown in FIG. 12B. The header A of the input cells is separated, and the separated header is transferred to the new header sending section 32 to convert the header B for routing in the switching shelf. Then, the header B is added to the payload, and sent from the reading controller 35.

Further, the interface 36 controls reading timing of the new header in the new header sending section 32, checks header parity errors, checks payload parity errors, and notifies the result to the controller 6 (refer to FIG. 3), when detecting errors.

Figure 13:
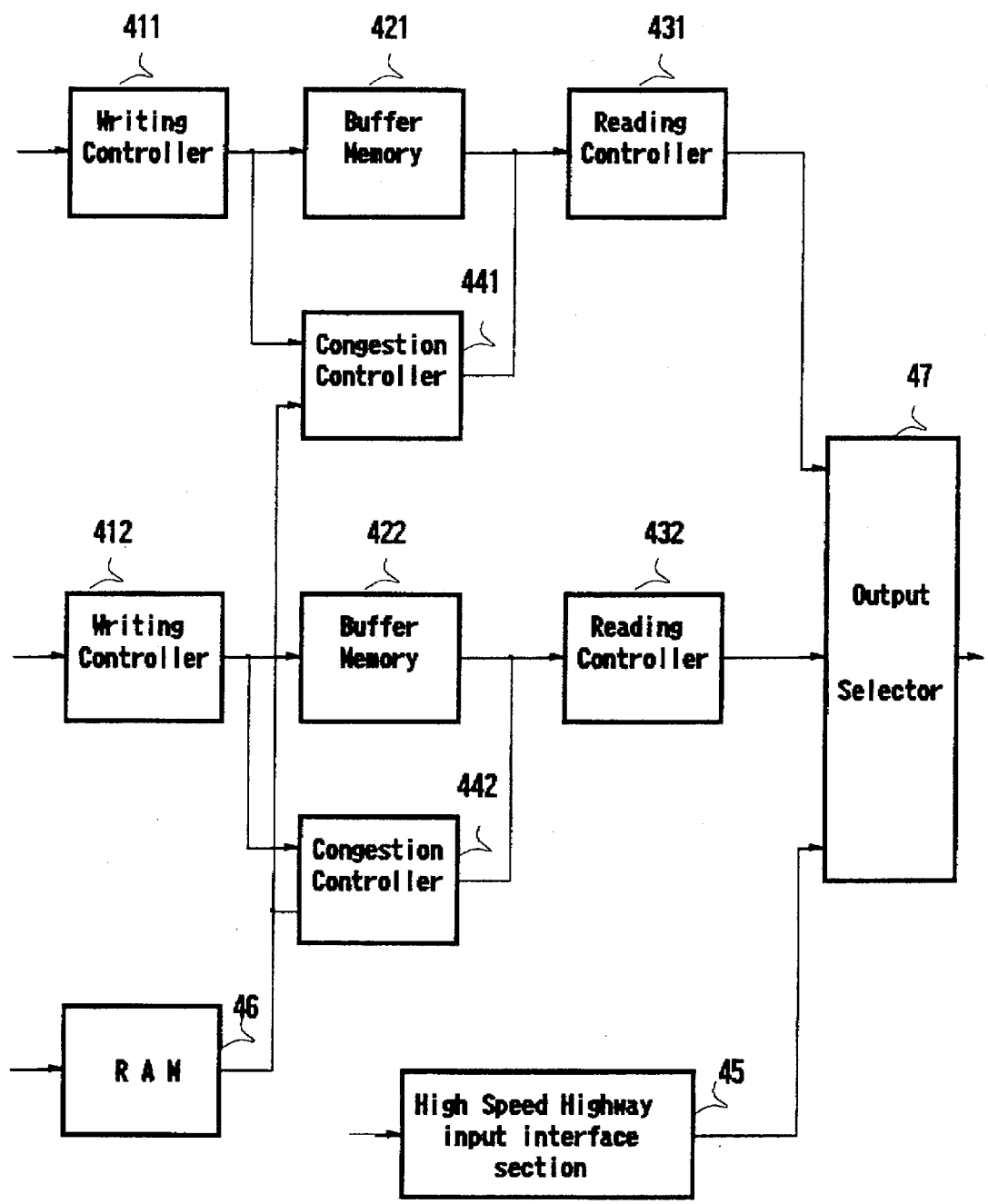
FIG. 13 shows an embodiment of a demultiplexor in FIG. 3.

FIG. 13 is an explanatory diagram of the embodiment of the multiplexer, and more particularly, it shows a multiplexer in one of the sets of channel corresponding sections #0 and #1, #2 and #3, #4 and #5, and #6 and #7, which are formed on the common LSIs 40, 41, 42 and 43, as explained in FIGS. 4 and 5. For example, in LSI 40, the set of the channel corresponding sections #0 and #1 is formed.

Each set of writing controllers 411 and 412, buffer memories 421 and 422, reading controllers 431 and 432, congestion controllers 441 and 442 are provided in correspondence with the channel corresponding sections #0 and #1 in the individual interface section.

An interface 46, which has interface function for transmitting signals with the controller 6 formed of a micro processor (refer to FIG. 3), collects data, such as parity errors and the number of discarding cells, and controls to set a threshold value for controlling congestion or set the specified VPI/VCI.

A high speed highway input interface section 45 has interface function with a high speed highway, which transfers multiplexed cells sent from the plurality of duplex individual interface sections and controls parity check of the input cells, parity pseudo-fault, and generation of reference clocks, which are supplied to the reading controllers 431 and 32.

Referring now to FIG. 4, output from the output selector corresponding to LSI 41 is inputted to the high speed highway input interface section 45. Further, the output from the output selector 47 corresponding to the LSI 41 is inputted to the high speed highway input interface section 45 corresponding to the LSI 41.

In this way, the outputs from the channel corresponding sections #0 and #1, #2 and #3, #4 and #5, and #6 and #7 are perpendicularly continued, and the ATM cell, which are time-division multiplexed, are outputted from one output selector 47 to the switching shelf.

Further, each structure and function of each functional block will be explained as follows. The writing controllers 411 and 412 control parity check, serial conversion of 8 bits ×54 bytes to 48 bits×9 bytes, parity generation for writing to the buffer memories 421 and 422, notification of completion of writing one cell, processing for discarding cells, and monitoring one cell length for the cells sent from the header convertor 3 corresponding to the individual interface section (refer to FIG. 3).

The buffer memories 421 and 422 are formed of, for example, a random access memory (RAM) having dual port required for 52 cells including parity bits (49 bits×468 words).

The reading controllers 431 and 432 control address generation for reading cells from the buffer memories 421 and 422, parity check of reading cells, monitoring the specified VPI/VCI, and counting of the passed cells. Further, the congestion controllers 441 and 442 control monitoring/notification of the usage of buffer memories 421 and 422, congestion for the setting value, instruction for discarding the cells to the writing controller.

As explained in the ATM switch according the present invention, which provides a switch network section, a common section and an individual interface section, the common section includes a demultiplexer 1, a user cell discarding section 2, a header convertor 3, a multiplexer 4, an information receiver 5 and a controller 6.

The information receiver 5 identifies whether the individual interface section is simplex or duplex according to the information sent from the individual interface section, and the controller 6 sets the condition for demultiplexing in the demultiplexer 1. Further, the controller 6 sets the condition for discarding the user cells in the user cell discarding section 2. Therefore, the common section can be commonly used in both of the case of employing simplex individual sections as shown in FIG. 1 and duplex individual interface section as shown in FIG. 2. That brings an advantage for reducing the cost of the system.

The user cell discarding section 2 passes all the cells when employing a simplex individual interface section and controls as to discard the user cells in only the case where employing standby duplex individual interface section. Therefore, it is possible to prevent from transferring the same user cells divided into active and standby groups to the switch network section and transfer the OAM cells to the active and the standby groups, and easily perform various kinds of maintenance and operation. That means it becomes possible to prevent from multiplexing and transferring the same user cells and securely transfer the OAM cells.

Furthermore, the demultiplexer 1 demultiplexes the cells by employing all the value of tag when employing the simplex individual interface section. When employing the duplex individual interface section, the demultiplexer 1 can easily distribute the cells into active and standby groups by demultiplexing the lower tag value with the use of bits.

When employing duplex individual interface section, it becomes possible to distribute the processing for discarding the user cells in the common section by discarding the user cells in the standby individual interface section or the standby duplex device. That brings an effectiveness to reduce the burden in the processing of the common section.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes that come within the meaning and range of equivalency of the claims are therefore intended to be embraced therein.

What is claimed is:

1. An ATM switch for transferring ATM cells formed of a data field and a header by switching routing based on a control data included in the header, comprising:

an individual interface section including an interface function with subscribers;

a switch network section for forming routing based on the control data included in the header; and a common section provided between the individual interface section and the switch network section having, a demultiplexer for demultiplexing the ATM cells sent from the switch network section and transferring the demultiplexed ATM cells to the individual interface sections;

a user cell discarding section for discarding user cells sent from the individual interface section under a specified condition, a header convertor for converting the header of the ATM cells sent from the individual interface section to a header for routing in the switch network section, a multiplexer for multiplexing the cells and transferring the multiplexed cells to the switch network section, an information receiver for receiving information from the individual interface section and identifying whether the individual interface section has a simplex or a duplex structure according to the information, and a controller for setting the specified condition of discarding the user cells in the user cell discarding section according to identification by the information receiver.

2. The ATM switch according to claim 1, wherein the specified condition set in the controller of the common section is that the user cell discarding section is stopped to discard the user cells, when employing a simplex individual interface section, and the user cell discarding section discards the user cells for an active groups, while being stopped to discard the user cells for a standby group, when employing a duplex individual interface section.

3. The ATM switch according to claim 1, wherein the controller in the common section makes the demultiplexer demultiplex the ATM cells according to a tag value in a header of the cell, when employing a simplex individual interface section, and the controllers makes the demultiplexer distribute the cells by demultiplexing the cells according to lower bits of the tag value, when employing a duplex individual interface section.

4. The ATM switch according to claim 1, wherein the specified condition set in the controller of the common section is that the user cell discarding section passes all cells sent from an active individual interface section and discards the user cells sent from a standby individual interface section, when employing a duplex individual interface section.

* * * * *